Oct. 19, 1948.    G. E. MEGEL ET AL    2,451,684
TOOLHOLDER FOR AUTOMATIC LATHES
Filed April 15, 1946
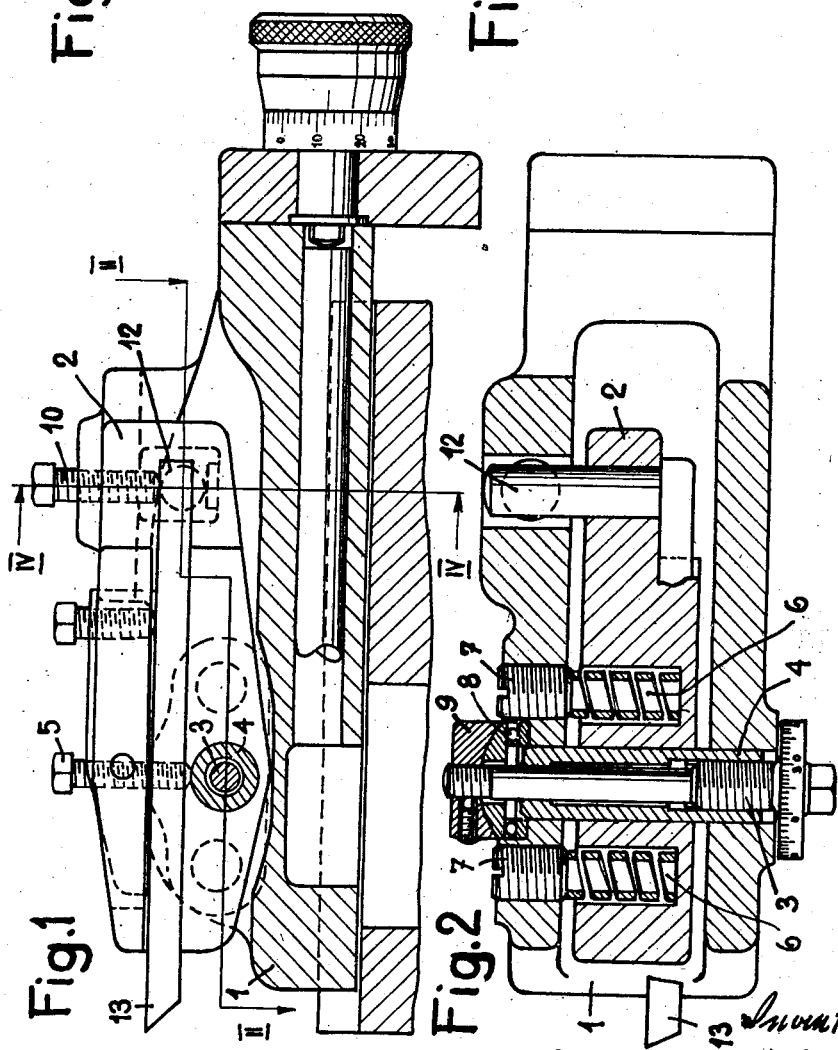
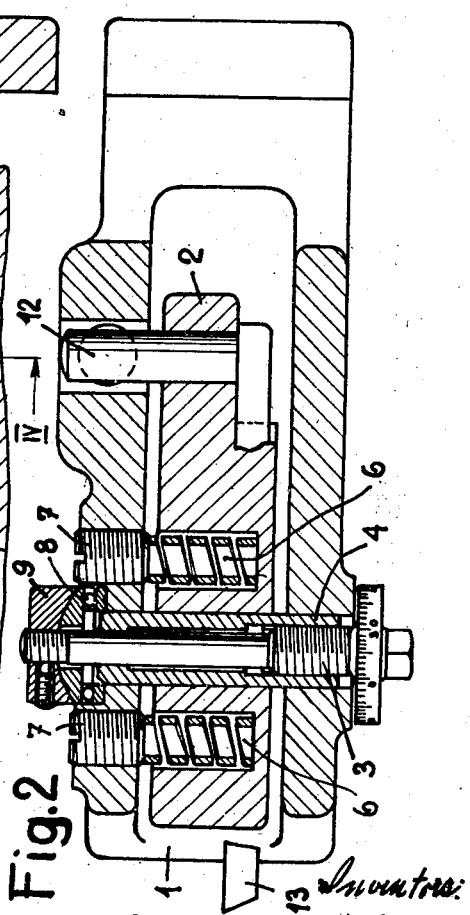
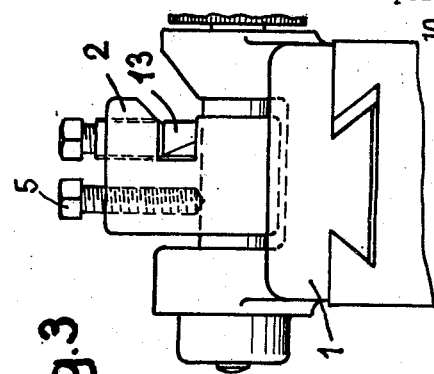
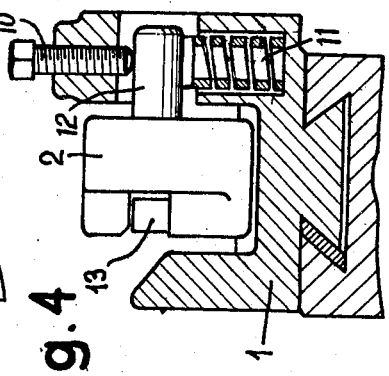
Inventors:
G. E. Megel & H. Mancia,
By E. F. Wenderoth Atty Patented Oct. 19, 1948

2,451,684

UNITED STATES PATENT OFFICE 2,451,684

TOOLHOLDER FOR AUTOMATIC LATHES

Guillaume Ernest Mégel and Henri Mancia, Moutier, Switzerland, assignors of one-half to Usines Tornos Fabrique de Machines Moutier S. A., Moutier, Switzerland, a Swiss firm Application April 15, 1946, Serial No. 662,249
In Switzerland April 11, 1945

Section 1, Public Law 690, August 8, 1946
Patent expires April 11, 1965

2 Claims. (Cl. 82—36)

The present invention relates to a tool holder for automatic lathes, comprising a supporting member provided with fastening means for the tool and pivotably mounted between the two side parts of a U-shaped slide. According to the invention the fulcrum pin of the said supporting member is provided, at least on a part of its length with a micrometer screw on which the latter is mounted by means of a tapped bushing so that by screwing the said micrometer screw the supporting member respectively the tool fixed thereto can be adjusted in transverse direction.

Preferably the supporting member is submitted to the action of two pressure springs which are arranged so as to laterally push the supporting member thus avoiding all transverse play thereof.

The accompanying drawing shows, by way of example, a constructional form of the tool holder according to the invention.

Fig. 1 shows, partly in a side elevation and partly in a longitudinal section, a tool holder according to the invention.

Fig. 2 is a horizontal section according to the line II—II in Fig. 1.

Fig. 3 is a front elevation of the tool holder according to Fig. 1.

Fig. 4 is a vertical section according to the line IV—IV in Fig. 1.

The tool holder according to the Figs. 1-4 comprises a slide 1 having a U-shaped transverse section. Between the side parts of this slide 1 is pivotally mounted a supporting member 2. The fulcrum pin 3 on which is mounted the supporting member 2 is provided, on a part of its length, with a micrometer screw as shown in Fig. 2. This pin 3 carries a bushing 4 which is tapped at its end corresponding to the micrometer screw and is fixed to the supporting member 2 by means of a set screw 5, as shown in Figs. 1 and 3. The supporting member 2 is provided, on opposite sides of the pin 3, with two holes in which are housed two pressure springs 6 against which bear two adjusting screws 7 arranged in the corresponding side part of the slide 1. In the same side part is arranged, concentrically to the fulcrum pin 3, a ball thrust bearing 8 the outside ball race of which forms a ball and socket joint together with a stop nut which is secured to the corresponding end of the pin 3 by means of a screw. Owing to the lateral pressure of the springs on the supporting member 2, all lateral play of the latter is avoided. For transverse adjustment of the supporting member 2 respectively of the tool 13 secured thereto, the micrometer screw may just be turned in one or the other sense. The angular adjustment of the supporting member 2 around the pin 3 can be effected by means of a regulating screw 10 (Fig. 4) which is acting, against the action of a pressure spring 11, on a side arm 12 secured to back end of the supporting member 2.

What we claim is:

1. A tool holder for automatic lathes comprising a U-shaped slide, a tool supporting member pivotally mounted between the side members of said slide, means for pivotally mounting said supporting member on said slide comprising a tapped bushing in said supporting member and a fulcrum pin inserted therethrough, a micrometer screw on said fulcrum pin for adjusting said supporting member transversely of said slide, said supporting member having two holes on a side thereof arranged on opposite sides of said fulcrum pin, springs inserted in said holes, and adjusting screws in said slide abutting against said springs whereby tension of said springs may be adjusted for preventing transverse play of said supporting member.

2. A tool holder for automatic lathes comprising a U-shaped slide, a tool supporting member pivotally mounted between the side members of said slide, means for pivotally mounting said supporting member on said slide comprising a tapped bushing in said supporting member and a fulcrum pin inserted therethrough, a micrometer screw on said fulcrum pin for adjusting said supporting member transversely of said slide, an end of said fulcrum pin extending through a side member of said slide, a ball thrust bearing arranged concentrially to said fulcrum pin in the same said side member of said slide, a nut on the extended end of said fulcrum pin, said nut and the outer ball race of said ball thrust bearing forming a ball and socket joint and means for preventing transverse play of said supporting member.

GUILLAUME ERNEST MÉGEL.
HENRI MANCIA.

REFERENCES CITED

The following references are of record in the file of this patent:

UNITED STATES PATENTS

| Number | Name | Date |
|---|---|---|
| 2,351,892 | Welburg | June 20, 1944 |
| 2,360,567 | Lloyd | Oct. 17, 1944 |

FOREIGN PATENTS

| Number | Country | Date |
|---|---|---|
| 690,605 | Germany | Apr. 30, 1940 |